(12) United States Patent
Garcia-Martin et al.

(10) Patent No.: US 6,757,552 B1
(45) Date of Patent: Jun. 29, 2004

(54) SIGNALLING IN A TELECOMMUNICATIONS SYSTEM

(75) Inventors: Miguel-Angel Garcia-Martin, Madrid (ES); Juan Maria Garcia Gonzales, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/787,761

(22) PCT Filed: Sep. 23, 1999

(86) PCT No.: PCT/EP99/07066

§ 371 (c)(1),
(2), (4) Date: Jun. 19, 2001

(87) PCT Pub. No.: WO00/19758

PCT Pub. Date: Apr. 6, 2000

(30) Foreign Application Priority Data

Sep. 25, 1998 (ES) .................................. 982071

(51) Int. Cl.⁷ ................................................. H04J 3/16
(52) U.S. Cl. ....................................... 455/560; 370/352
(58) Field of Search ............................ 455/560, 414.4, 455/561; 370/351, 352, 355, 356

(56) References Cited

U.S. PATENT DOCUMENTS 5,793,771 A  *  8/1998  Darland et al. ............. 370/467
6,587,684 B1 *  7/2003  Hsu et al. ................... 455/419
6,587,890 B1 *  7/2003  Kult et al. .................. 709/328

FOREIGN PATENT DOCUMENTS

| EP | 0781020 | 6/1997 |
| EP | 0853411 | 7/1998 |
| WO | WO97/42774 | 11/1997 |
| WO | WO98/28885 | 7/1998 |

OTHER PUBLICATIONS

Sevcik et al., "Customers in Driver's Seat: Private Intelligent Network Control Point", Proceedings of the International Switching Symposium, DE, Berlin, VDE Verlag, vol. Symp. 15, 1995, pp. 41–44.

* cited by examiner

*Primary Examiner*—Nay Maung
*Assistant Examiner*—Nick Corsaro

(57) ABSTRACT

Method for transmitting signaling information in a telecommunications network between a pair of application parts, the method comprising the steps of: generating signaling information at a first application part, including addressing information associated with the second application part, passing the signaling Information from the application part to a Transaction Capabilities Application Part (TCAP); passing the signaling information from the TCAP to an adaptation layer arranged to determine an IP address and port number associated with the addressing information; passing the signaling Information and the IP address and port number to an Internet Protocol (IP) part and transmitting the signaling information over an IP network to the destination IP address in one or more IP datagrams; decapsulating the signaling information at the destination associated with the IP address and at an adaptation layer identified by the port number; and routing the signaling information to the second application part.

9 Claims, 2 Drawing Sheets

SIGNALLING IN A TELECOMMUNICATIONS SYSTEM

FIELD OF THE INVENTION

The present invention relates to signalling in a telecommunications system and in particular, though not necessarily, to the transmission of signalling data in a Public Land Mobile Network.

BACKGROUND TO THE INVENTION

In a telecommunications system, signalling equipment and signalling channels are required for the exchange of information between system elements or nodes. In particular, this internode signalling informs the nodes of what is to be performed when a telephone or data call is to be set up or released in so-called "circuit-switched" connections. Signalling is also often used to communicate information on the status of the system and of individual subscribers.

Modern telecommunications systems now largely make use of Common Channel Signalling (CCS) whereby signalling information is transmitted on one or more dedicated signalling channels, distinct from the channels used to carry actual user information (e.g. voice or data). An important feature of CCS is that the same signalling system may support services in a variety of existing telecommunications networks, e.g. Public Switched Telephone Network (PSTN), Integrated Services Digital Network (ISDN), and Public Land Mobile Networks (PLMN), as well as proposed future protocols such as B-ISDN, enhancing greatly the interoperability of networks supporting different protocols.

Currently, the predominant CCS is known as Signalling System Number 7 (SS7), defined in the ITU-T (International Telecommunications Union-Technical) recommendations starting with Q.700. SS7 is a packet switched system occupying one time slot per frame of the Time Division Multiple Access (TDMA) E.1 or T.1 transmission formats (the other time slots being available for user voice or data information). Individual signalling message packets (referred to as Message Signalling Units or MSUs) are associated with respective individual telephone calls. As only a relatively small amount of signalling information is associated with a single telephone call, a single SS7 channel is able to handle all signalling between two network nodes (termed "signalling points") for several thousands of calls. It is noted that the route taken by an MSU in the SS7 network may be the same as that over which the associated telephone call is established, or it may be different.

As already noted, SS7 (along with other CCS systems) is able to support a number of different telecommunications networks (e.g. PSTN, ISDN, PLMN). In signal processing terms, SS7 comprises a Message Transfer Part (MTP) which deals with the physical transfer of signalling information over the signalling network (MTP layer 1), message formatting, error detection and correction, etc (MTP layer 2), and message routing (MTP layer 3). SS7 also comprises user parts and application parts which allow several "users" (i.e. ISDN User Part, Telephony User Part, Mobile Application Part, etc) to send signals in the same signalling network.

FIG. 1 illustrates a PLMN (GSM) having a Gateway Mobile Switching Centre (GMSC) 1 which provides an interface for the PLMN to "foreign" networks such as ISDNs, PSTNs, and other PLMNs. An exemplary Mobile Station (MS), registered to the PLMN, is indicated by the reference numeral 2. A number of exemplary nodes within the PLMN are also shown including: the GMSC 1; a Mobile Switching Centre (MSC) 3; a Base Station Controller (BSC) 4; a Base Transceiver Station (BTS) 5; an Intelligent Network node (IN) 6; a Visitor Location Register (VLR) 7; a Home Location Register (HLR) 8; an Authentication Centre (AUC) 9; and an Equipment Identity Register (EIR) 10. A more complete description of a PLMN, and other aspects of telecommunication networks, is given in "Understanding Telecommunications", vols. 1 & 2, Studentlitteratur, Lund, Sweden (ISBN 91-44-00214-9).

FIG. 1 indicates the various signalling interfaces which are used to signal between the network nodes detailed above. These interfaces include: the ISUP/TUP interfaces between the GMSC 1 and the foreign networks; the INAP interface used between the MSC 3 and Intelligent Network (IN) nodes; the MAP interface used between the MSC/GMSC 1,3 and PLMN specific nodes (VLR, HLR, AUC, EIR) 6–10; the BSSMAP used between the MSC 3 and the BSC 4; and the Abis interface between the BSC 4 and the BTS 5. Conventionally, all of these interfaces serve as user parts and application parts of an SS7 network, residing above the MTP layers. The resulting protocol stacks are illustrated in FIG. 2.

In order to provide the INAP and MAP (as well as certain other application parts, e.g. OMAP, which also rely upon connectionless communication over the signalling network) with certain functions and protocols as well as a standard and common interface between the application parts and the network signalling service, a Transaction Capabilities Application Part (TCAP or TC) is interposed between these application parts and the MTP. Furthermore, a Signalling Connection and Control Part (SCCP) is interposed between the TCAP and the MTP for controlling the signalling connection. The SCCP is also used by certain other application parts (referred to as SCCP users, e.g. BSSMAP) which do not use the services of the TCAP and which rely upon connection-oriented and/or connectionless communication over the signalling network.

SS7 makes use of addresses known as Destination Point Codes (DPCs) to route signalling data through the "visibility area" of a telecommunications network, the visibility area typically being the network itself together with the interfaces between the network and "foreign" networks under the control of other operators. A DPC is placed in the header of an MSU and is examined by a network signalling point (SP) upon receipt of the MSU to determine the next hop for the MSU en route to its destination. So-called Subsystem Numbers (SSNs) are used by SS7 to direct data to specific application parts (see below) and are also included in MSUs.

With reference to FIG. 2, it is noted that routing between various application parts above the SCCP layer is achieved using so-called "global titles". A global title contains (amongst other things) a number dialled in the PLMN or the number of a roaming mobile station (for the specific example shown in FIG. 1). The SCCP contains all the network and routing information required to analyse a global title and translate it into a DPC and, optionally, a Subsystem Number (SSN) which identify the next or final signalling point in the SS7 network.

In an SS7 network, any change in the DPC allocation within the visibility area requires the operator to update the DPC database (or routing table) which exists in each SP of the network. This however adds significantly to the maintenance overheads of the network. The dedicated nature of SS7 makes it in general expensive to install and maintain (in relation to both hardware and software), a significant barrier especially to prospective new telecom operators. Furthermore, as an SS7 network occupies bandwidth on TDMA frames of the E.1/T.1 transmission protocols (one slot per time frame), the bandwidth available for actual user call data is restricted. Yet another disadvantage of traditional signalling architectures is that the interoperability of SS7 networks is limited due to the dedicated nature of the MTP physical layers.

SUMMARY OF THE PRESENT INVENTION

It is an object of the present invention to overcome or at least mitigate the above noted disadvantages of existing telecommunication signalling systems.

According to a first aspect of the present invention there is provided a method of transmitting signalling information in a telecommunications network between a pair of application parts, the method comprising;

generating said signalling information at a first of said application parts, including addressing information associated with the second of the application parts;

passing said signalling information from the application part to a Transaction Capabilities Application Part (TCAP);

passing said signalling information from the TCAP to an adaptation layer arranged to determine an IP address and port number associated with said addressing information;

passing said signalling information and said IP address and port number to an Internet Protocol (IP) part and transmitting the signalling information over an IP network to said destination IP address in one or more IP datagrams;

decapsulating said signalling information at the destination associated with the IP address and at an adaptation layer identified by said port number; and routing the signalling information to the second user part.

The use of the IP based network for transmitting signalling information reduces the need for conventional signalling infrastructure (although this may still be used in part). IP based networks offer increased flexibility (e.g. routers of the network have self-updating routing tables) and reduced operating, maintaining, and engineering costs in comparison with conventional telecommunications signalling networks.

It will be appreciated that the Signalling Connection and Control Part (SCCP), which is normally interposed between the TCAP and the MTP in an SS7 network, is omitted from the present invention in so far as it relates transmitting signalling information from the TCAP to an IP part. Rather, the adaptation layer interfaces the TCAP to the IP part. SCCP is designed to segment signalling messages into 272 octet blocks, such as are required by the MTP of SS7. In contrast, individual TCP and UDP datagrams are capable of carrying a much larger number of octets than an MTP message. Thus, by omitting the SCCP, the present invention avoids unnecessary segmentation of signalling messages.

The method of the present invention is particularly applicable to Public Land Mobile Networks (PLMN), where said pair of application parts may be, for example, peer Mobile Application Parts (MAPs) or Intelligent Network Application Parts (INAPs) present at respective signalling nodes of the PLMN.

In certain embodiments of the invention, the adaptation layer performs a translation between a Destination Point Code (DPC) and an associated IP address and port number. In other embodiments however, the IP address and port number are obtained at the adaptation layer directly from a global title provided as part of the addressing information from the application part.

Preferably, the adaptation layer is arranged to provide all service functionality that the TCAP would otherwise receive from a SCCP including sequence control, return on error, and congestion control.

Preferably, the adaptation layer is arranged to encapsulate signalling and addressing information into a form suitable for further processing by the IP part.

Preferably, the signalling information is passed from the adaptation layer to the IP part via a UDP or TPC encapsulating layer. More preferably, the adaptation layer is arranged to encapsulate signalling and addressing information into a form suitable for further processing by the UDP or TCP layers.

According to a second aspect of the present invention there is provided apparatus for transmitting signalling information in a telecommunications network between a pair of application parts, the apparatus comprising;

generating means for generating said signalling information at a first of said application parts, including addressing information associated with the second of the application parts;

a Transaction Capabilities Application Part (TCAP) for receiving said signalling information;

an adaptation layer arranged to receive said signalling information from the TCAP and to determine an IP address and port number associated with said addressing information;

an Internet Protocol (IP) part arranged to receive said signalling information and said IP address and port number and to transmit the signalling information over an IP network to said destination IP address in one or more IP datagrams;

processing means at the destination associated with the IP address and at an adaptation layer identified by the port number, arranged to decapsulate said signalling information; and routing means arranged to route the signalling information to the second user part.

According to a third aspect of the present invention there is provided a gateway node for coupling signalling information from a common channel signalling (CCS) network of a telecommunications system, to an Internet Protocol (IP) based network, the gateway node comprising:

a Message Transfer Part (MTP) arranged to receive signalling information over the CCS network;

a Signalling Connection Control Part (SCCP) arranged to receive said signalling information from the MTP whilst controlling the signalling connection over the CCS network;

an adaptation layer arranged to receive said signalling information from the SCCP and to determine an IP address and port number associated with a global title or Destination Port Code (DPC) included in the signalling information;

an IP layer for receiving the signalling information and the IP address and port number from the adaptation layer and for arranging for transmission of the signalling information over the IP based network in the form of IP datagrams.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
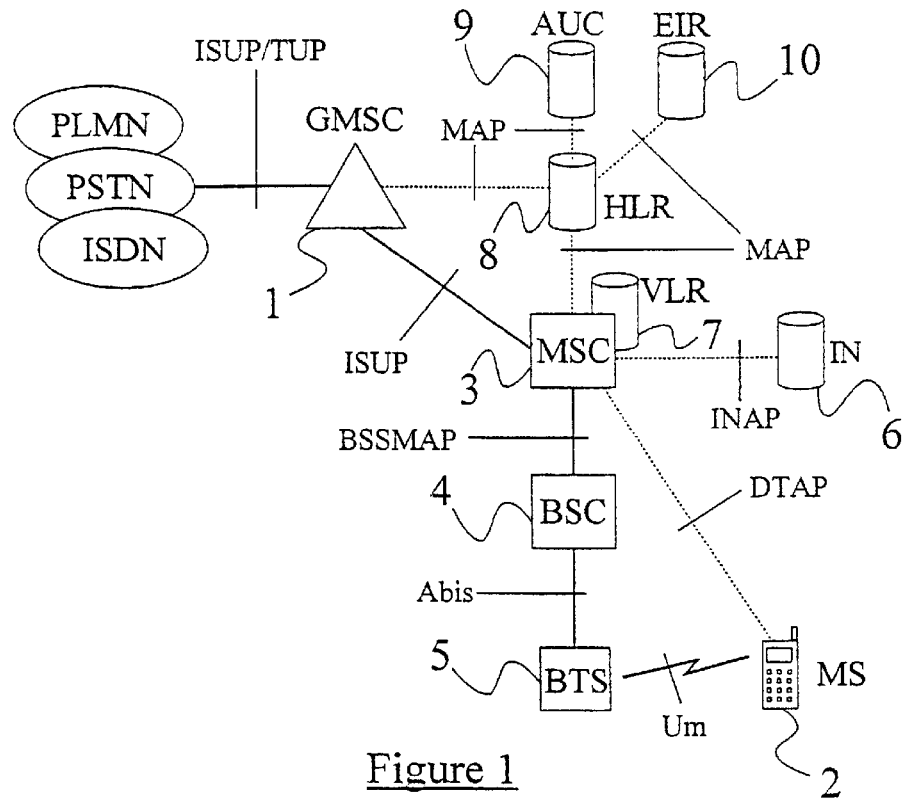
FIG. 1 illustrates schematically a GSM network together with the signalling protocols used therein.
Figure 2:
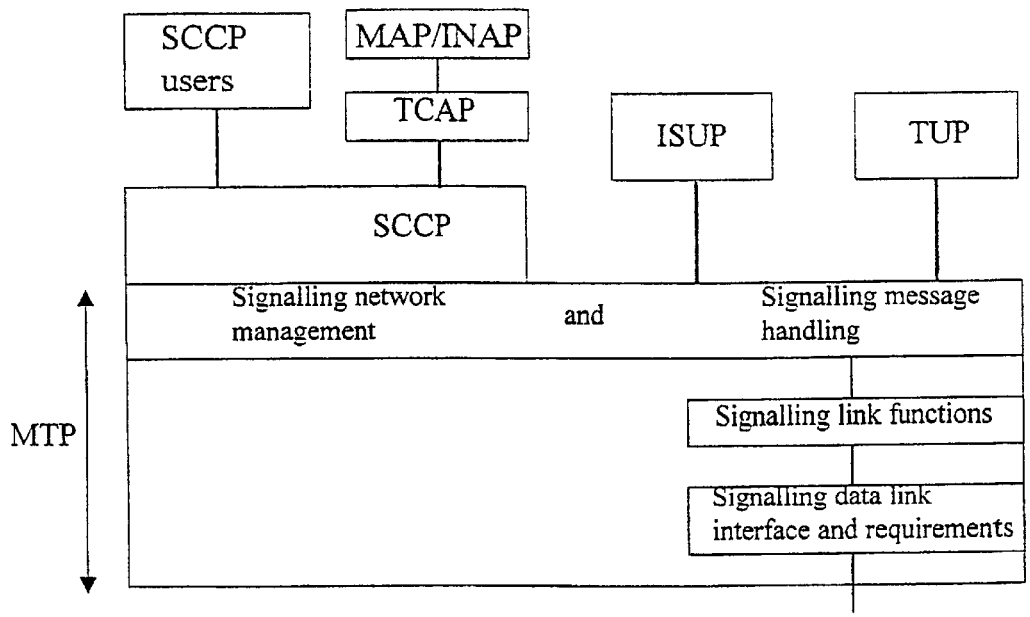
FIG. 2 illustrates schematically the signal processing layers of an SS7 protocol of the network of FIG. 1.
Figure 3:
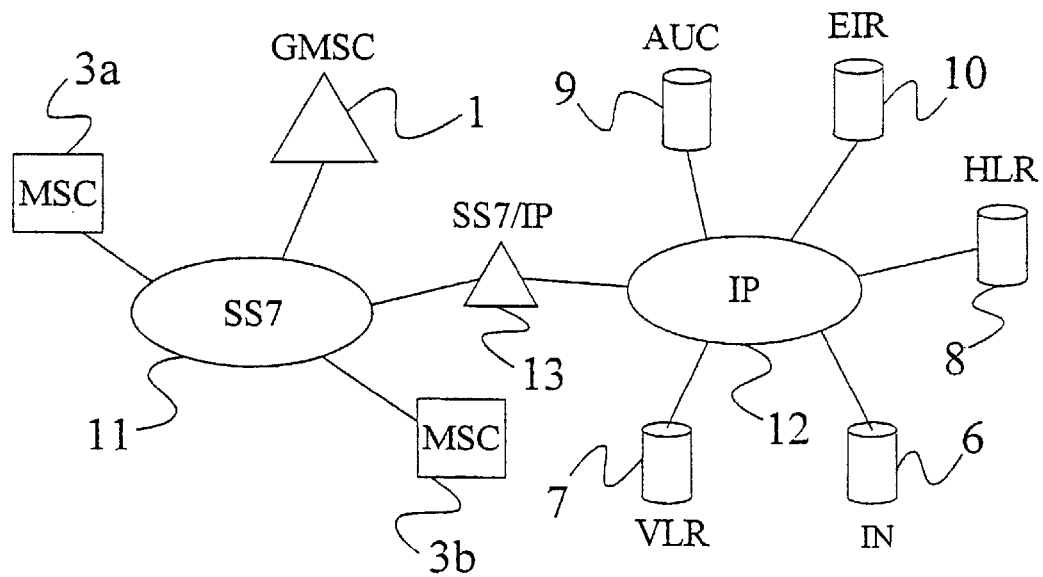
FIG. 3 illustrates schematically the use of a TCP/IP network to transmit signalling information in a telecommunications network.

The general structure in terms of signalling nodes and signalling interfaces of a GSM PLMN has already been described above with reference to FIGS. 1 and 2. FIG. 3 shows various nodes of the GSM PLMN where it is assumed, for the purpose of this discussion, that each of these nodes comprises an application part (e.g. MAP, INAP) having a conventional composition such that it can be supported by SS7 for the sending of signalling information to a peer application part at some other node. Considering in particular the MSCs 3a,3b and the GMSC 1, these nodes are connected to a conventional SS7 network 11 for the purpose of communicating signalling information.

Intelligent network and PLMN specific nodes, including the IN node 6, VLR 7, HLR 8, AUC 9, and EIR 10, each have application parts (and in particular MAP and INAP) similarly constructed for peer-to-peer communication via SS7. However, these nodes each comprise an additional interface which enables them to communicate signalling information via an IP network 12. In order to enable interworking of the SS7 connected nodes and the IP network connected nodes, the two signalling networks 11,12 are connected by a gateway node 13.

Figure 4:
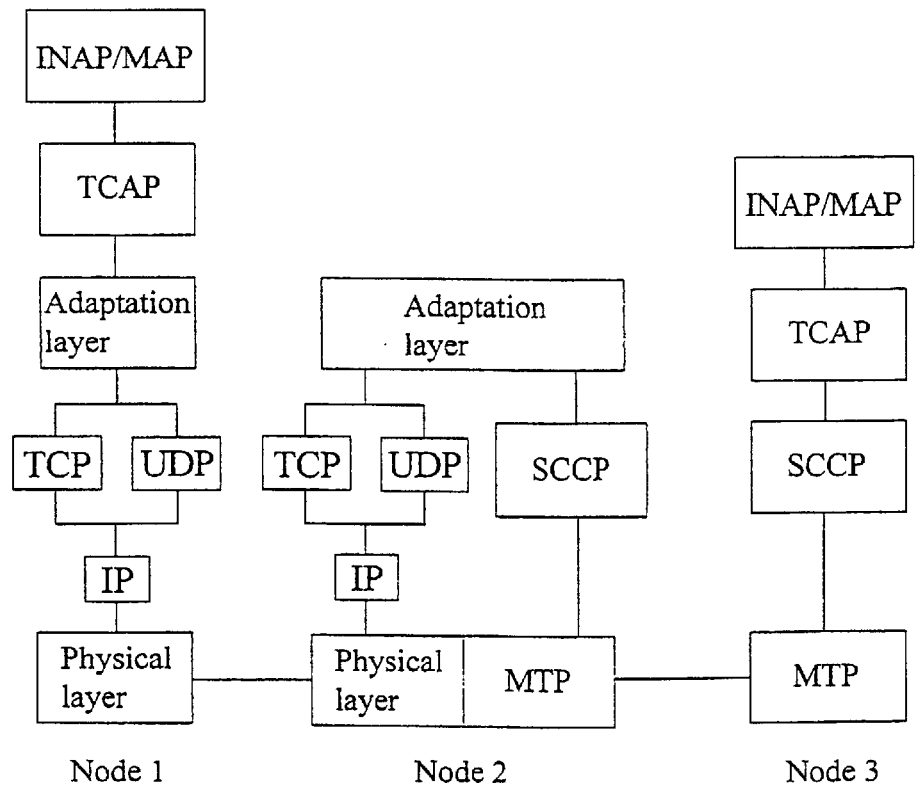
FIG. 4 illustrates signalling protocol layers present at nodes of the telecommunications network of FIG. 3.

FIG. 4 shows schematically the protocol layers present at a node connected to the IP network 12 (Node 1), at the gateway node 13 (Node 2), and at a node connected to the SS7 network 11 (Node 3). Of the layers shown, the INAP/MAP, TCAP, SCCP, TCP/IP, physical layer, and MTP are substantially conventional in structure and therefore will not be described in detail. Rather, the reader should make reference to the literature including "Understanding Telecommunications", vols. 1 & 2, Studentlitteratur, Lund, Sweden (ISBN 91-44-00214-9), and the ITU-T (International Telecommunications Union-Technical recommendations starting with Q.700 which define Signalling System Number 7 (SS7). The present discussion is concerned in the main with the Adaptation layer which enables the TCP/IP and physical layers to replace the MTP (and SCCP), such that the TCAP can communicate over the IP network 12.

As has already been discussed above, MSUs are routed in an SS7 network using Destination Point Codes (DPCs) which are attached to each of the MSUs. Within a signalling point, messages are directed to a specific application (e.g. HLR, VLR, etc) on the basis of a Subsystem Number (SSN) also attached to the MSU. On the other hand, datagrams in an IP network are routed to a destination machine on the basis of an IP address, and to an application running on a particular machine on the basis of an IP port number. A main function of the Adaptation layer therefore is to translate between global titles and IP addresses and port numbers, a process which is achieved using a database associating global titles and IP addresses/port numbers.

At Node 1, for signalling data to be transmitted to Node 3, the adaptation layer determines an IP address and port number associated with a global title contained in the message "primitive" received from the TCAP. The Adaptation layer then encapsulates the primitives into a format which is acceptable to the TCP (or UDP) layer before passing the information to the TCP (or UDP) layers. A further function of the Adaptation layer is to monitor the state of the connection between the two communicating peer application parts. For example, if communication between the application parts breaks down, and cannot be re-established, then the Adaptation layer may report this to the TCAP. It will be appreciated that the Adaptation layer communicates with the TCAP in a manner identical to that of the SCCP (which is omitted).

The TCP/UDP layers pass the encapsulated signalling information to the IP layer. The messages transmitted over the IP network 12 have the following structure:

| Physical header | IP header | TCP header | Addresses Global title/DPC/SSN | TCAP header | INAP/MAP data |
|---|---|---|---|---|---|

At the gateway node 13 (Node 2 in FIG. 4), the Adaptation layer lies above the IP network and SS7 network side layers. The adaptation layer provides for decapsulation of the received message and passes it to the SCCP on the SS7 network side for further processing.

The messages received by the SCCP from the adaptation layer contain either a global title or a DPC/SSN or both. In the case that the message contains only a global title, then the SCCP translates that titles into a DPC/SSN as already described above. For transmission over the SS7 network 11, the SCCP passes the primitives, with associated DPCs, to the MTP which handles transmission in a known manner. Similarly, the protocol layers at the receiving node (Node 3) correspond to the conventional SS7 structure.

It will be appreciated by the skilled person that various modifications may be made to the above described embodiment without departing from the scope of the present invention. For example, the connectivity of the network nodes shown in FIG. 3 may be varied, such that certain IN nodes are connected to the SS7 network, whilst the MSCs and/or the GMSC may be connected to the IP network. It may also be the case that nodes are connected to both the SS7 network and the IP network, such that one network provides a back-up for the other network.

It will also be appreciated that in the event that the TCAP provides addressing information to the adaptation layer which includes a DPC/SSN, rather than just a global title, then the adaptation layer may translate between the DPC and the IP address/port number.

What is claimed is:

1. A method of transmitting signalling information in a telecommunications network between a pair of application parts, the method comprising;

generating said signalling information at a first of said application parts, including addressing information associated with the second of the application parts;

passing said signalling information from the application part to a Transaction Capabilities Application Part (TCAP);

passing said signalling information from the TCAP to an adaptation layer arranged to determine an IP address and port number associated with said addressing information;

passing said signalling information and said IP address and port number to an Internet Protocol (IP) part and transmitting the signalling information over an IP network to said destination IP address in one or more IP datagrams;

decapsulating said signalling information at the destination associated with the IP address and at an adaptation layer identified by said port number; and routing the signalling information to the second user part.

2. A method according to claim 1 for use in a Public Land Mobile Network (PLMN), where said pair of application parts are peer Mobile Application Parts (MAPs) or Intelligent Network Application Parts (INAPs) present at respective signalling nodes of the PLMN.

3. A method according to claim 1 and comprising passing addressing information from the TCAP to the adaptation layer which includes a global title.

4. A method according to claim 1 and comprising passing addressing information from the TCAP to the adaptation layer which includes a Destination Point Code and optionally a Subsystem Number.

5. A method according to claim 1, wherein the adaptation layer provides all service functionality that the TCAP would otherwise receive from a SCCP including sequence control, return on error, and congestion control.

6. A method according to claim 1 and comprising passing the signalling information from the application part to the adaptation layer via a Transaction Capabilities Application Part.

7. A method according to claim 1, wherein the adaptation layer encapsulates signalling and addressing information into a form suitable for further processing by a UDP/TCP layer disposed between the adaptation layer and the IP part.

8. Apparatus for transmitting signalling information in a telecommunications network between a pair of application parts, the apparatus comprising:

generating means for generating said signalling information at a first of said application parts, including addressing information associated with the second of the application parts;

a Transaction Capabilities Application Part (TCAP) for receiving said signalling information;

an adaptation layer arranged to receive said signalling information from the TCAP and to determine an IP address and port number associated with said addressing information.

an Internet Protocol (IP) part arranged to receive said signalling information and said IP address and port number and to transmit the signalling information over an IP network to said destination IP address in one or more IP datagrams;

processing means at the destination associated with the IP address and at an adaptation layer identified by the port number, arranged to decapsulate said signaling information; and routing means arranged to route the signalling information to the second user part.

9. A gateway node for coupling signalling information from a common channel signalling (CCS) network of a telecommunications system, to an Internet Protocol (IP) based network, the gateway node comprising:

a Message Transfer Part (MTP) arranged to receive signalling information over the COS network;

a Signalling Connection Control Part (SCCP) arranged to receive said signalling information from the MTP whilst controlling the signalling connection over the CCS network;

an adaptation layer arranged to receive said signalling information from the SCCP and to determine an IP address and port number associated with a global title or Destination Port Code (DPC) included in the signalling Information;

an IP layer for receiving the signalling information and the IP address and port number from the adaptation layer and for arranging for transmission of the signalling information over the IP based network in the form of IP datagrams.

* * * * *

UNITED STATES PATENT AND TRADEMARK OFFICE
CERTIFICATE OF CORRECTION

PATENT NO. : 6,757,552 B1
DATED : June 29, 2004
INVENTOR(S) : Garcia-Martin et al.

It is certified that error appears in the above-identified patent and that said Letters Patent is hereby corrected as shown below:

Title page,
Item [30], Foreign Application Priority Data, should be changed from:
"Sep. 25, 1998 (ES)..............982071" to -- Sep. 25, 1998 (FI).................982071 --

Signed and Sealed this

Twenty-first Day of December, 2004

JON W. DUDAS
*Director of the United States Patent and Trademark Office*